L. D. LEWIS.
WRENCH.
APPLICATION FILED SEPT. 7, 1918.
1,312,406.
Patented Aug. 5, 1919.
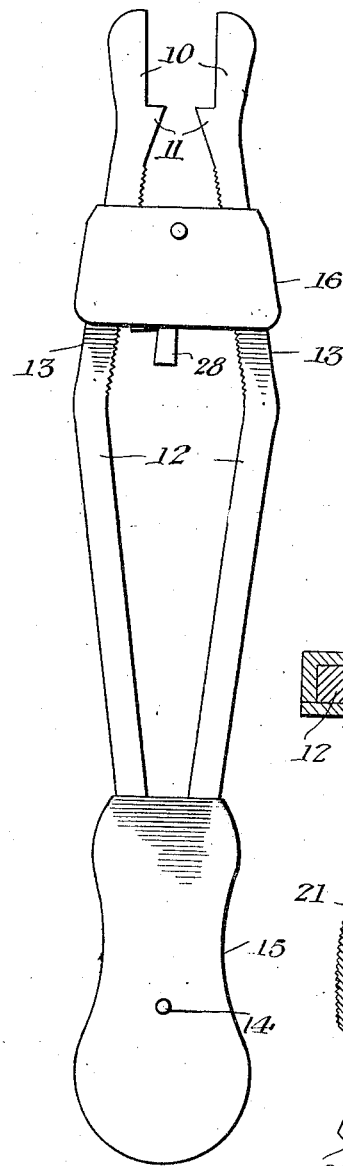
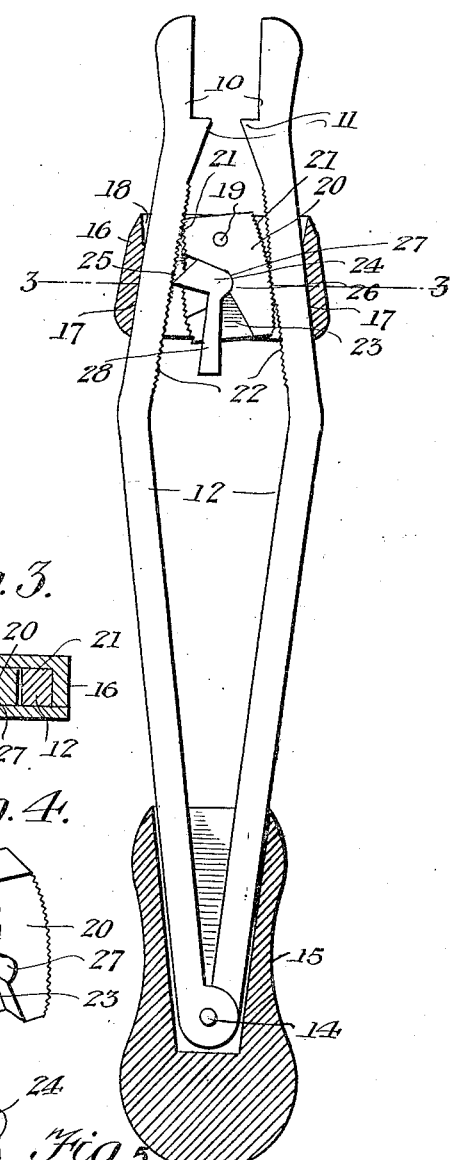
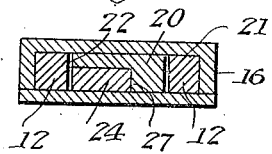
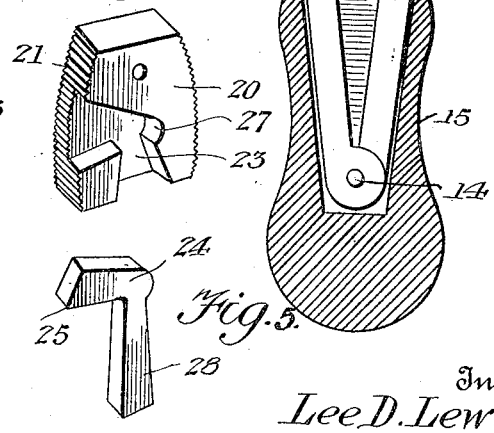
Inventor
Lee D. Lewis
By Victor J. Evans.
Attorney

UNITED STATES PATENT OFFICE.

LEE D. LEWIS, OF TULSA, OKLAHOMA.

WRENCH.

1,312,406.     Specification of Letters Patent.     Patented Aug. 5, 1919.

Application filed September 7, 1918. Serial No. 253,043.

*To all whom it may concern:*

Be it known that I, LEE D. LEWIS, a citizen of the United States, residing at Tulsa, in the county of Tulsa and State of Oklahoma, have invented new and useful Improvements in Wrenches, of which the following is a specification.

This invention relates to wrenches and has for its object the provision of a wrench capable of being easily and quickly adjusted and when so adjusted will be held securely in position.

Another object of the invention is to provide a novel form of adjusting means which is slidable along the shanks of the wrench jaws and carries means for positively engaging said shanks, the said means permitting an instantaneous adjustment of the jaws which are pivotally secured together.

Other objects and advantages of the invention will be apparent as the following description is read in connection with the accompanying drawings.

In the drawings:—

Figure 1 is a side elevation of a wrench embodying the present invention;

Fig. 2 is a sectional view taken through the sleeve showing the adjusting means and the shanks of the wrench jaws in elevation;

Fig. 3 is a transverse sectional view;

Fig. 4 is a detail perspective view of the pivoted block; and

Fig. 5 is a similar view of the dog.

Referring to the drawings in detail, like characters of reference denote corresponding parts throughout the several views.

The wrench illustrated in the accompanying drawings includes a pair of oppositely movable pivoted jaws 10, each of which is formed at one end with an inwardly extending lug 11 to provide a shoulder, which shoulders coöperate to form a socket for the reception of a nut or other element. The shanks 12 of the jaws 10 are outwardly bowed with respect to one another as shown to provide opposed inclined surfaces 13 and are pivotally mounted as shown at 14 within a handle or grip 15.

Slidably mounted upon the shanks 12 is a sleeve 16, the inner walls 17 of which are adapted to slidably engage the outer edges of the said shanks throughout a portion of their length. Pivotally mounted within the sleeve 16 upon a pin 19, is a block 20, each edge of which is roughened or serrated as indicated at 21 for engagement with similarly roughened or serrated faces 22 of the shanks 12. The block 20 is cut away as indicated at 23 for the reception of a dog 24, the head of which is pointed as shown at 25 for engagement with the roughened or serrated face 22 of one of the shanks 12. The dog 24 is formed with a heel 26, which lies within a rounded portion 27 of the cut away portion 23, which permits of a pivot or rocking movement of the dog. A handle 28 is formed upon the dog 24 which extends outwardly from the sleeve 16 for the purpose of operating the dog.

By swinging the dog 24 so as to engage its toothed end 25 with the teeth or serrations upon one of the shanks 12, the block 20 will be moved upon the pivot 19 and the teeth or serrations upon the opposite edge of the said block will be engaged with the teeth or serrations upon the other shank 12, so that the jaws of the wrench will be held against relative movement. A movement of the dog in an opposite direction will disengage the point 25 and permit the block to swing upon its pivot. Owing to the shape of the side edges of the block 20, the latter will be disengaged from the teeth of the shanks 12 when the dog is in a disengaged position and permit free movement of the said shanks within the sleeve.

The invention is susceptible of various changes in its form, proportions and minor details of construction and the right is reserved to make such changes.

Having described the invention, what is claimed is:—

1. A wrench comprising a pair of pivoted jaws, a sleeve slidably mounted thereon and pivoted laterally movable means located in the sleeve and engageable with each of said jaws to hold them against pivotal movement.

2. A wrench comprising a pair of pivoted jaws, a sleeve slidably mounted thereon, and means including a pivotally mounted element carried by the sleeve and engageable with the jaws for holding the latter against pivotal movement.

3. A wrench comprising a pair of pivoted jaws, a sleeve slidably mounted thereon, and means including an eccentrically mounted element carried by the sleeve and engageable with the jaws for holding the latter against pivotal movement.

4. A wrench comprising a pair of pivoted jaws, a sleeve slidably mounted thereon, and means including a member pivotally mounted within the sleeve and engageable with the jaws for holding the latter against pivotal movement.

5. A wrench comprising a pair of pivoted jaws, a sleeve freely slidable along said jaws, and pivotally movable means located within the sleeve for engagement with the jaws for holding the latter against pivotal movement.

In testimony whereof I affix my signature.

LEE D. LEWIS.

Copies of this patent may be obtained for five cents each, by addressing the "Commissioner of Patents, Washington, D. C."